US008676276B2

(12) United States Patent  
Kim et al.

(10) Patent No.: US 8,676,276 B2  
(45) Date of Patent: Mar. 18, 2014

(54) MOBILE DEVICE HAVING SOLAR CELL AND POWER CONTROL METHOD THEREOF

(75) Inventors: Min Seok Kim, Yongin-si (KR); Yeo Moon Yoon, Suwon-si (KR); Sun Hwan Min, Uiwang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 584 days.

(21) Appl. No.: 12/658,459

(22) Filed: Feb. 10, 2010

(65) Prior Publication Data

US 2010/0210322 A1    Aug. 19, 2010

(30) Foreign Application Priority Data

Feb. 13, 2009  (KR) .................. 10-2009-0011888

(51) Int. Cl.  
*H04B 1/38* (2006.01)

(52) U.S. Cl.  
USPC ............................ 455/572; 320/102; 320/110

(58) Field of Classification Search  
USPC .................... 455/572; 320/102, 110  
See application file for complete search history.

(56) References Cited

U.S. PATENT DOCUMENTS

2006/0238163 A1*  10/2006  Chen ............................. 320/114  
2008/0186162 A1*   8/2008  Rajan et al. ............. 340/539.13  
2010/0167797 A1*   7/2010  Morichi ....................... 455/572

FOREIGN PATENT DOCUMENTS

JP          2009010945 A  *  1/2009  
KR    10-2006-0001173        6/2004

* cited by examiner

*Primary Examiner* — Amanico Gonzalez

(57) ABSTRACT

A mobile device has a solar cell and a rechargeable battery and may be connected with an external power source. A method for a power control of the mobile device allows a continuous and reliable power supply through selective connections with the solar cell, the battery and the external power source. In one embodiment, if the battery is unavailable or absent, the mobile device executes at least one function thereof by using electric power supplied from the solar cell. In another embodiment, if the battery is available with the mobile device powered off, the mobile device charges the battery by using electric power supplied from the solar cell. In still another embodiment, if the battery is available with the mobile device powered on, the mobile device executes at least one function thereof by using electric power supplied from both the solar cell and the battery.

21 Claims, 6 Drawing Sheets

MOBILE DEVICE HAVING SOLAR CELL AND POWER CONTROL METHOD THEREOF

CROSS-REFERENCE TO RELATED APPLICATION(S) AND CLAIM OF PRIORITY

The present application is related to and claims priority to an application entitled "MOBILE DEVICE HAVING SOLAR CELL AND POWER CONTROL METHOD THEREOF" filed in the Korean Intellectual Property Office on Feb. 13, 2009 and assigned Serial No. 10-2009-0011888, the contents of which are incorporated herein by reference.

TECHNICAL FIELD OF THE INVENTION

The present invention relates in general to a mobile device which has a solar cell and, more particularly, to a mobile device having a solar cell and a method for a power control of the mobile device, whereby the power supply and battery charging are controlled depending on selective connections with the solar cell, a rechargeable battery and an external power source.

BACKGROUND OF THE INVENTION

With modern scientific technique advanced dramatically, a great variety of mobile devices have been ceaselessly developed and introduced in the art. Moreover, rapid advances in mobile communication technologies are investing traditional mobile devices with many useful applications that meet customer's demands. Accordingly, users today of mobile devices come to use information in various forms of voice, text, graphic, and the like and to enjoy music, broadcast, game, and the like.

Meanwhile, such mobile devices have inherent shortcomings of limited battery life due to their portability and size-limited battery. Moreover, a variety of functions, applications and services added to advanced mobile devices may often require much more increased power consumption than ever. Accordingly required are solutions to the above problems in association with an effective power control of mobile devices.

SUMMARY OF THE INVENTION

To address the above-discussed deficiencies of the prior art, it is a primary object to provide at least the advantages described below.

Aspects of the present invention are to provide a mobile device having a solar cell and a related power control method in order to allow a continuous and reliable power supply.

According to one aspect of the present invention, provided is a method for a power control of a mobile device having a solar cell, the method includes: ascertaining whether a battery is available for the mobile device; if the battery is unavailable or absent, establishing a power supply path between the solar cell and a power control unit of the mobile device; and executing at least one function of the mobile device by using electric power supplied from the solar cell through the power supply path.

According to another aspect of the present invention, provided is a method for a power control of a mobile device having a solar cell, the method includes: ascertaining whether a battery is available for the mobile device; if the battery is available with the mobile device powered off, establishing a power supply path between the battery and the solar cell; and charging the battery by using electric power supplied from the solar cell through the power supply path.

According to still another aspect of the present invention, provided is a method for a power control of a mobile device having a solar cell, the method includes: ascertaining whether a battery is available for the mobile device; if the battery is available with the mobile device powered on, establishing a first power supply path between the solar cell and a power control unit of the mobile device; and executing at least one function of the mobile device by using electric power supplied from both the solar cell and the battery.

According to yet another aspect of the present invention, provided is a mobile device includes: a solar cell configured to produce electric power under the sunshine; a rechargeable battery configured to supply electric power to the mobile device; and a control unit configured to receive the electric power supplied from at least one of the battery and the solar cell, and to execute at least one function of the mobile device.

According to aspects of the present invention, it is possible not only to supply a mobile device with electric power but also to charge a battery even without any external power source.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
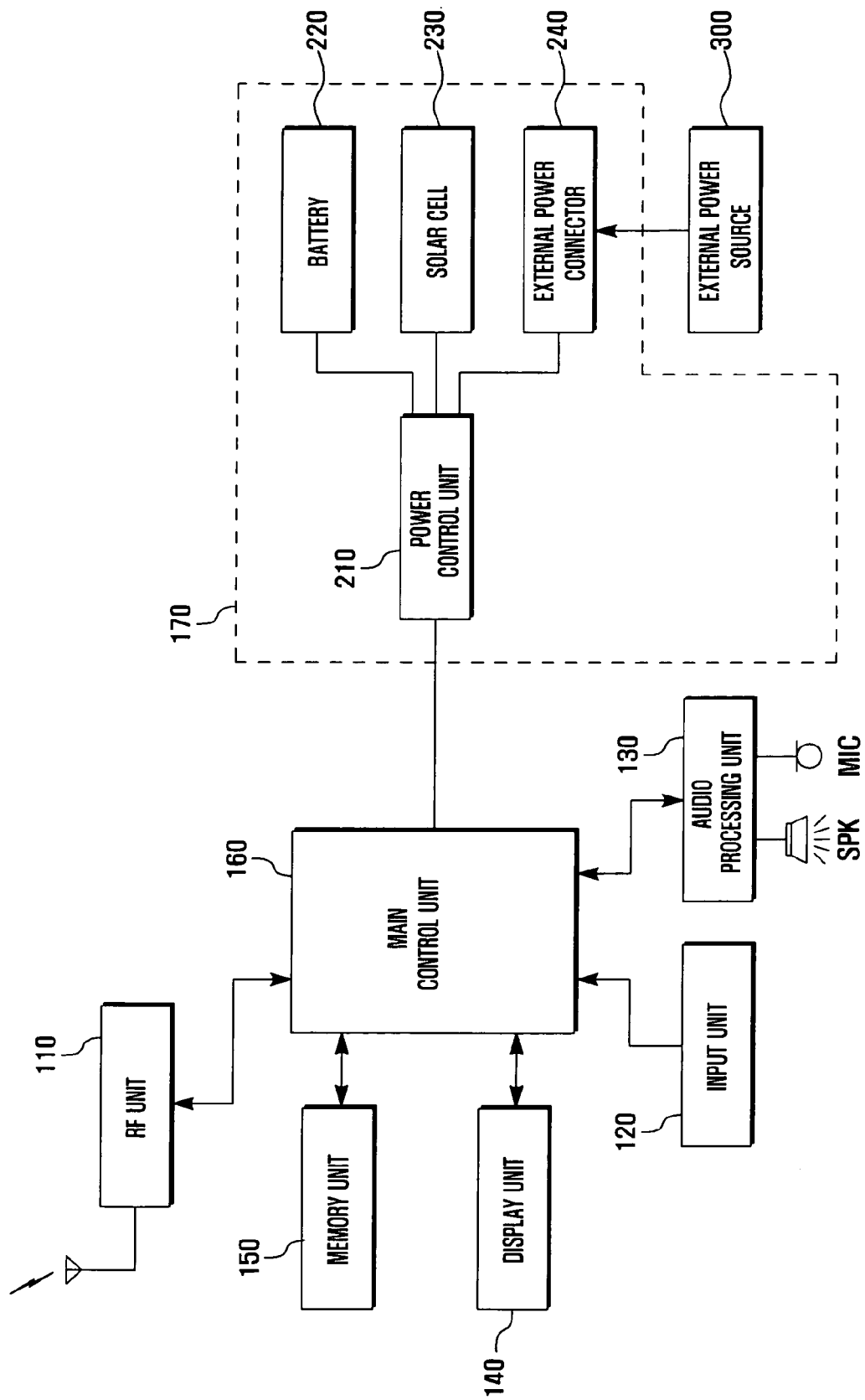
FIG. 1 illustrates a configuration of a mobile device in accordance with an exemplary embodiment of the present invention.

FIG. 1 illustrates a configuration of a mobile device in accordance with an exemplary embodiment of the present invention.

The mobile device includes a radio frequency (RF) unit 110, an input unit 120, an audio processing unit 130, a display unit 140, a memory unit 150, a power supply unit 170, and a main control unit 160. Particularly, the power supply unit 170 includes a power control unit 210, a rechargeable battery 220, a solar cell 230, and an external power connector 240. An external power source 300 may be connected with the power supply unit 170 through the external power connector 240.

The mobile device having the above-mentioned elements utilizes the solar cell 230 as a power source or for charging the battery 220. Now, each element of the mobile device will be described individually in detail.

The RF unit 110 establishes necessary communication channels under the control of the control unit 160. That is, the RF unit 110 forms a voice call channel, a data communication channel, and a video call channel with a mobile communication system. The RF unit 110 may include an RF transmitter that upwardly converts the frequency of signals to be transmitted and amplifies the signals, and an RF receiver that amplifies received signals with low-noise and downwardly converts the frequency of the received signals.

Particularly, the RF unit 110 according to this invention may perform initialization and then establish communication channels with a base station under the control of the control unit 160 when electricity is supplied from the power supply unit 170. At this time, if the battery 220 is available in the power supply unit 170, the RF unit 110 may be supplied with electric power from the battery 220. Additionally, if the solar cell 230 is further available in the power supply unit 170, the RF unit 110 may be supplied with electric power from both the battery 220 and the solar cell 230. However, if the battery 220 is unavailable or absent in the power supply unit 170, the RF unit 110 may be supplied with electric power from only the solar cell 230.

The input unit 120 includes a plurality of input keys and function keys which are provided to receive a user's input. Here, the function keys may have navigation keys, side keys, shortcut keys, and any other special keys. The input unit 120 creates various key signals in association with user's selection or commands and delivers them to the control unit 160.

Particularly, the input unit 120 includes a power key to which functions of power-on and power-off are assigned by turns. When power-off is selected using the power key, the mobile device cuts off the supply of electricity from the battery 220. In this case, the supply of electricity from the solar cell 230 is also cut off, and then the solar cell 230 enters into a state of waiting for the power supply.

The audio processing unit 130 has a speaker (SPK) for outputting audio signals and a microphone (MIC) for receiving audio signals. When a selected one of various contents stored in the memory unit 150 is executed and has an audio file, the audio processing unit 130 may output audio signals in the audio file through the speaker. The audio processing unit 130 may be supplied with electric power from the battery 220 while operating the speaker and the microphone, and may be further supplied with electric power from the solar cell 230.

The display unit 140 represents a variety of information inputted by a user or offered to a user, such as various menus of the mobile device. That is, the display unit 140 may offer many display pages, visual images, or graphical elements in association with the use of the mobile device, including an idle page with a static or dynamic background image, a menu page with several depths, a message input page, a call execution image, and any others related to the execution of contents or applications.

Particularly, the display unit 140 according to this invention may be supplied with electric power from the battery 220 when the battery 220 is available. Also, if the solar cell 230 is further available, the display unit 140 may be supplied with electric power from both the battery 220 and the solar cell 230. However, if the battery 220 is unavailable or absent in the power supply unit 170, the display unit 140 may be supplied with electric power from only the solar cell 230 or no power according to the capacity of the solar cell 230. That is, when the capacity of the solar cell 230 is suitable for the operation of the RF unit 110 only, the display unit 140 may be supplied with no power.

Alternatively, the display unit 140 may be formed of a liquid crystal display (LCD), an organic light emitting device (OLED), or any other equivalents. Also, the display unit 140 may be fabricated in a touch-based form such as a touch screen which has an input function in addition to a display function. For example, the display unit 140 may have a display panel and touch sensors disposed on the display panel. If a touch screen is available, the mobile device may offer various touch-based menu pages on the touch screen.

The memory unit 150 stores a variety of applications required for the operation of the mobile device. Additionally, the memory unit 150 stores a key map or a menu map used for the operation of the touch screen if the display unit 140 is formed of the touch screen. Here, the key map may have various well known types such as a keyboard map, a 3×4 key map, a qwerty key map, or a special control key map suitable for the operation of a specific application in use. Also, the menu map may have several menu items offered by the mobile device and may be a special menu map suitable for the operation of a specific application in use. The memory unit 150 may consist of a program region and a data region.

The program region stores an operating system (OS) for booting the mobile device, and applications used for the execution of various files or functions. Such applications may have an application for supporting a voice call or a video call, a web browser for access to the Internet server, an MP3 application for playing music, an image viewing application, a video playing application, a document editing application, and the like. Additionally, the program region may store a particular application for the operation of touch sensors in the touch screen if the display unit 140 is formed of the touch screen.

Particularly, the program region according to this invention may store a particular application for the control of the solar cell 230. The solar cell control application may cut off the power supply from the solar cell 230 when the external power source 300 is connected with the external power connector 240. In addition, the solar cell control application may control a charging process of the battery 220.

Specifically, the solar cell control application may enable the solar cell 230 to operate as a single power source of the mobile device when the battery 220 is unavailable or absent in the power supply unit 170. Meanwhile, if the external power source 300 is connected with the external power connector 240, the solar cell control application may disable the solar cell 230, namely, cut off the power supply from the solar cell 230. Additionally, the solar cell control application may help to use the only particular ones among all functions of the mobile device according to the capacity of the solar cell 230. If the battery 220 is available, the solar cell control application may enable the solar cell 230 to charge the battery 220 or to operate as a power source together with the battery 220. A related description will be given below.

The data region stores data created while the mobile device is used. In particular, the data region may store a great variety of contents. Also, the data region may store user's input received through the touch screen when the display unit 140 is formed of the touch screen.

The power supply unit 170 is configured to generate or store electricity, to receive electricity from the outside, and to supply electricity to respective elements of the mobile device. In order to execute the above functions, the power supply unit 170 is composed of the power control unit 210, the battery 220, the solar cell 230, and the external power connector 240 as mentioned above. Additionally, the external power source 300 may be connected with the power supply unit 170 through the external power connector 240.

The power control unit 210 delivers electric power to the main control unit 160 from at least one of the battery 220, the solar cell 230 and the external power connector 240. That is, the power control unit 210 controls the selective power supply of the battery 220, the solar cell 230 and the external power connector 240 under the control of the main control unit 160. Also, the power control unit 210 controls a charging process of the battery 220.

Specifically, when the battery 220 is available, the power control unit 210 may control the power supply of the battery 220, depending on the power-on or power-off of the mobile device. That is, while the mobile device is turned on, the power control unit 210 enables the battery 220 to supply electric power to the main control unit 160. At this time, the power control unit 210 may further enable the solar cell 230 to supply electric power to the main control unit 160. However, while the mobile device is turned off, the power control unit 210 disables the battery 220 and instead enables the solar cell 230 to charge the battery 220.

If the external power source 300 is connected with the external power connector 240, the power control unit 210 may cut off the power supply from the solar cell 230, deliver electric power of the external power source 300 to the main control unit 160, and control a charging process of the battery 220. Meanwhile, if electric power supplied from the solar cell 230 is very smaller than electric power supplied from the external power source 300, the power control unit 210 may cut off a current path toward the solar cell 230 in order to prevent a reverse current of the external power source 300 and protect circuits coupled to the solar cell 230.

If the battery 220 is unavailable or absent in the power supply unit 170, the power control unit 210 may control the driving of the mobile device by using electric power supplied from the solar cell 230. That is, while the mobile device is turned off, the power control unit 210 may enable the solar cell 230 to enter into a state of waiting for the power supply. However, while the mobile device is turned on, the power control unit 210 may enable the solar cell 230 to supply electric power to the main control unit 160. Also, if the external power source 300 is connected with the external power connector 240, the power control unit 210 may cut off the power supply from the solar cell 230 according to user's settings.

The battery 220 is a rechargeable secondary battery and may be fabricated in various forms such as a nickel (Ni) battery, a cadmium (Cd) battery, a nickel-cadmium (Ni—Cd) battery, a nickel-hydrogen (Ni—H) battery, a lithium ion (Li-ion) battery, a chemical battery, and the like. The battery 220 may be charged by means of the external power source 300 or the solar cell 230 and, unless being subjected to a charging process, may supply electric power to the main control unit 160 under the control of the power control unit 210.

The solar cell 230 is a device that converts photons into electric energy by using semiconductor characteristics. That is, the solar cell 230 produces electric power under the sunshine. Normally the solar cell 230 is formed of a P-N junction diode with a large size, which is based on photovoltaic energy conversion and has an asymmetric distribution of electrons in a semiconductor structure. For example, an n-type area in the P-N junction diode has a high electron density and a low hole density, and a p-type area vice versa. Therefore, in a state of thermal equilibrium, the unbalance of charge is caused by diffusion due to gradient of a carrier density in the diode formed of a junction of a p-type semiconductor and an n-type semiconductor. As a result, an electric field is created and thereby carrier diffusion may not happen anymore.

When the sunshine with energy greater than the band gap energy is incident upon such a junction diode, electrons are excited from a valence band to a conduction band. Excited electrons in a conduction band are allowed to move freely, and holes are produced at vacant positions in a valence band left by the absence of electrons. These excess carriers are diffused in a conduction band or in a valence band due to density differences. Although the energy barrier obstructs the flow of majority carriers in a p-type semiconductor or an n-type semiconductor, minority carriers produced by diffusion may move toward the other type semiconductor. This results in the movement of carriers, and thus a potential drop is caused by the upset of charge neutrality and produces an electromotive force between both sides of the p-n junction diode. This resulting electromotive force corresponds to electric power of a solar cell.

The solar cell 230 may be fabricated in the form of assembly of several cells. Also, the solar cell 230 may be formed of transparent, semitransparent or opaque materials according to fabrication technique. Generally the solar cell 230 in this invention is disposed on the body of the mobile device. If disposed at the backside or a front cover of the mobile device, the solar cell may have a semitransparent or opaque form. However, if disposed at the display unit 140 or the input unit 120 such as a keypad, the solar cell may have a transparent form. Meanwhile, the solar cell may not be disposed at a battery cover of the mobile device; but, if disposed, a path used to deliver electric power of the solar cell would be additionally formed from the battery cover to the power control unit 210.

The external power connector 240 is an interface to allow connections with the external power source 300. A typical 20-pin connector or 10-pin connector may be employed as the external power connector 240. Also, the external power connector 240 may have a form adapted to receive and securely fix a cable coupled to the external power source 300.

As well known, the external power source 300 may be an electric outlet, an electric generator, and the like, which may continually supply electric power more than a given amount. The external power source 300 may be equipped with an adapter coupled to an electric outlet, an electric generator, and the like, in order to perform a power conversion, and a cable interposed between the adapter and the external power connector 240.

In the meantime, the main control unit 160 initializes the respective elements of the mobile device when the power control unit 210 begins supplying electric power. After initialization, the main control unit 160 controls the flow of signals for executing predefined functions of the mobile device. Particularly, when the battery 220 is unavailable or absent in the power supply unit 170, namely, when the power control unit 210 is not connected with the battery 220, the main control unit 160 may perform minimum functions of the mobile device based on the capacity of power supply from the solar cell 230.

Specifically, the main control unit 160 may restrict the execution of functions of the mobile device, depending on the limited capacity of the solar cell 230. That is, if a mobile communication function is defined as a basic function of the mobile device, the main control unit 160 may allow first of all the power supply to elements used for a mobile communication function. Then the main control unit 160 may selectively activate other functions of the mobile device, depending on the capacity of power supply from the solar cell 230. Priorities may be assigned to the respective functions so as to assist a selective activation, and the main control unit 160 may perform a selective activation based on such priorities. For example, priorities may be determined in the order of a mobile communication function, a music file play function, and a broadcast reception function.

Figure 2:
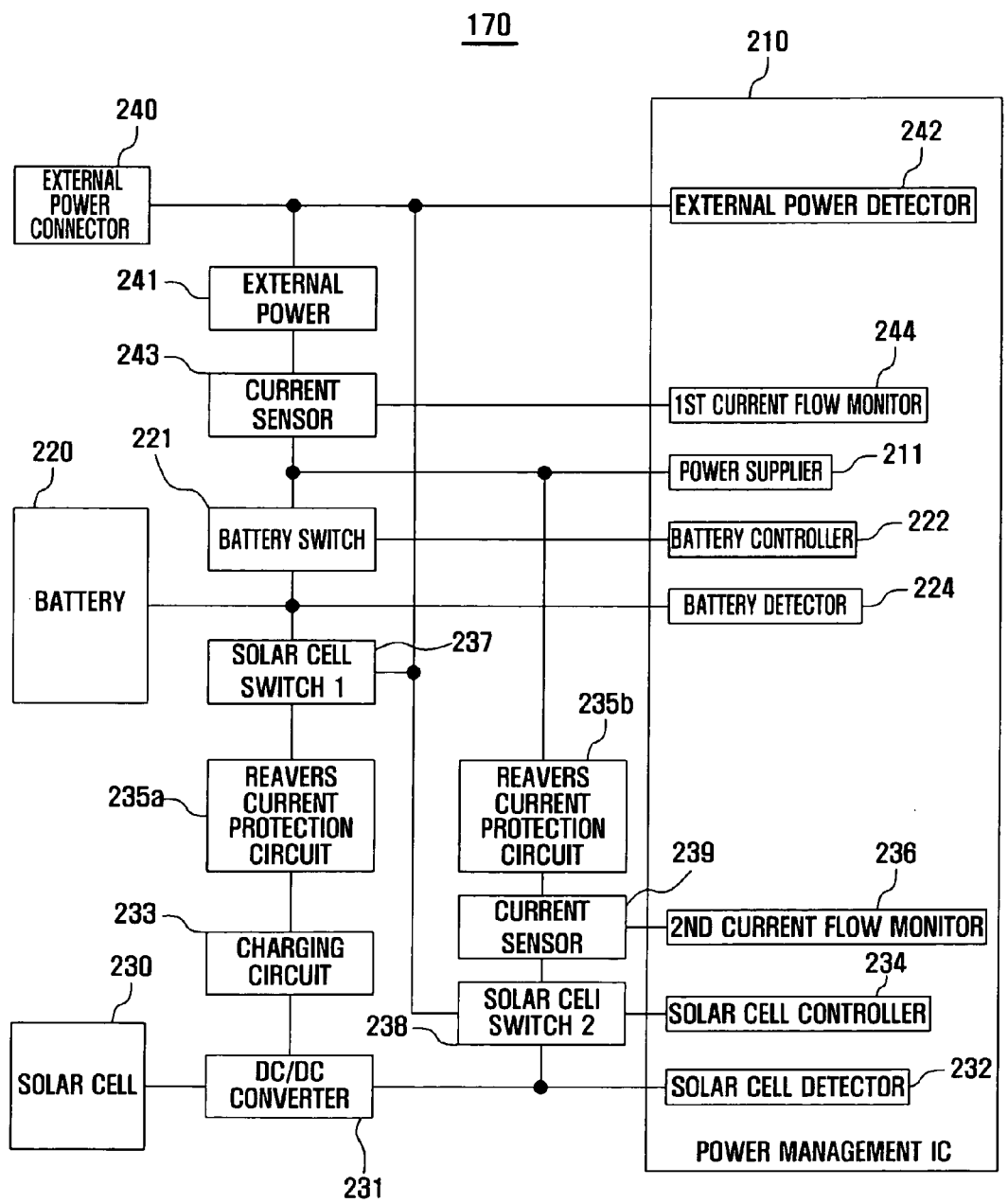
FIG. 2 illustrates a configuration of a power supply unit shown in FIG. 1.

FIG. 2 illustrates a configuration of the power supply unit 170 shown in FIG. 1.

The power control unit 210 of the power supply unit 170 may include an external power detector 242, a first current flow monitor 244, a power supplier 211, a battery controller 222, a battery detector 224, a second current flow monitor 236, a solar cell controller 234, and a solar cell detector 232.

Additionally, the power supply unit 170 may include an external power switch 241, a first current sensor 243, and a battery switch 221, all of which are disposed between the external power connector 240 and the battery 220. Also, the power supply unit 170 may include a first solar cell switch 237, a first reverse current protection circuit 235a, a charging circuit 233, and a DC/DC converter 231, all of which are disposed between the battery 220 and the solar cell 230. Furthermore, the power supply unit 170 may include a second reverse current protection circuit 235b, a second current sensor 239, and a second solar cell switch 238, all of which are disposed between the solar cell 230 and the power control unit 210.

The external power switch 241 is a device used to break or open an electric path from the external power connector 240 to the battery 220 and the power supplier 211. The first current sensor 243 is a device used to perform a sensing of an electric current supplied from the external power connector 240. Based on a current sensing of the first current sensor 243, the first current flow monitor 244 may detect overvoltage or excess current. The battery switch 221 is a device used to break or open an electric path from the external power connector 240 to the battery 220 or from the battery 220 to the power supplier 211 under the control of the battery controller 222.

The external power detector 242 is a unit used to ascertain whether the external power source is connected with the external power connector 240. If the external power source is connected, the external power detector 242 may inform the battery controller 222 about the connection. The power supplier 211 may be supplied with electric power from the external power source or the battery 220 through a path coupled to a node between the first current sensor 243 and the battery switch 221.

The DC/DC converter 231 is a device used to convert an electric current supplied from the solar cell 230 into a direct current. The charging circuit 233 is a configuration used to store charge offered by the solar cell 230 and supply it to the battery 220. The first reverse current protection circuit 235a is a configuration used to protect the solar cell 230 from a reverse current which occurs from the battery 220 or the external power source. The first solar cell switch 237 is a device used to break or open an electric path from the solar cell 230 to the battery 220. Under the control of the solar cell controller 234, the first solar cell switch 237 may operate together with the second solar cell switch 238. When the external power source supplies electric power, the first and second solar cell switches 237 and 238 may be closed under the control of the solar cell controller 234.

The second current sensor 239 is a device used to perform a sensing of an electric current supplied from the solar cell 230. Based on a current sensing of the second current sensor 239, the second current flow monitor 236 may detect overvoltage or excess current. The second reverse current protection circuit 235b is located between the power supplier 211 and the solar cell 230, and is used to protect the solar cell 230 from a reverse current which occurs from the power supplier 211.

Now, the flow of an electric current in the above configuration will be described in detail with reference to FIGS. 3 and 4.

Figure 3:
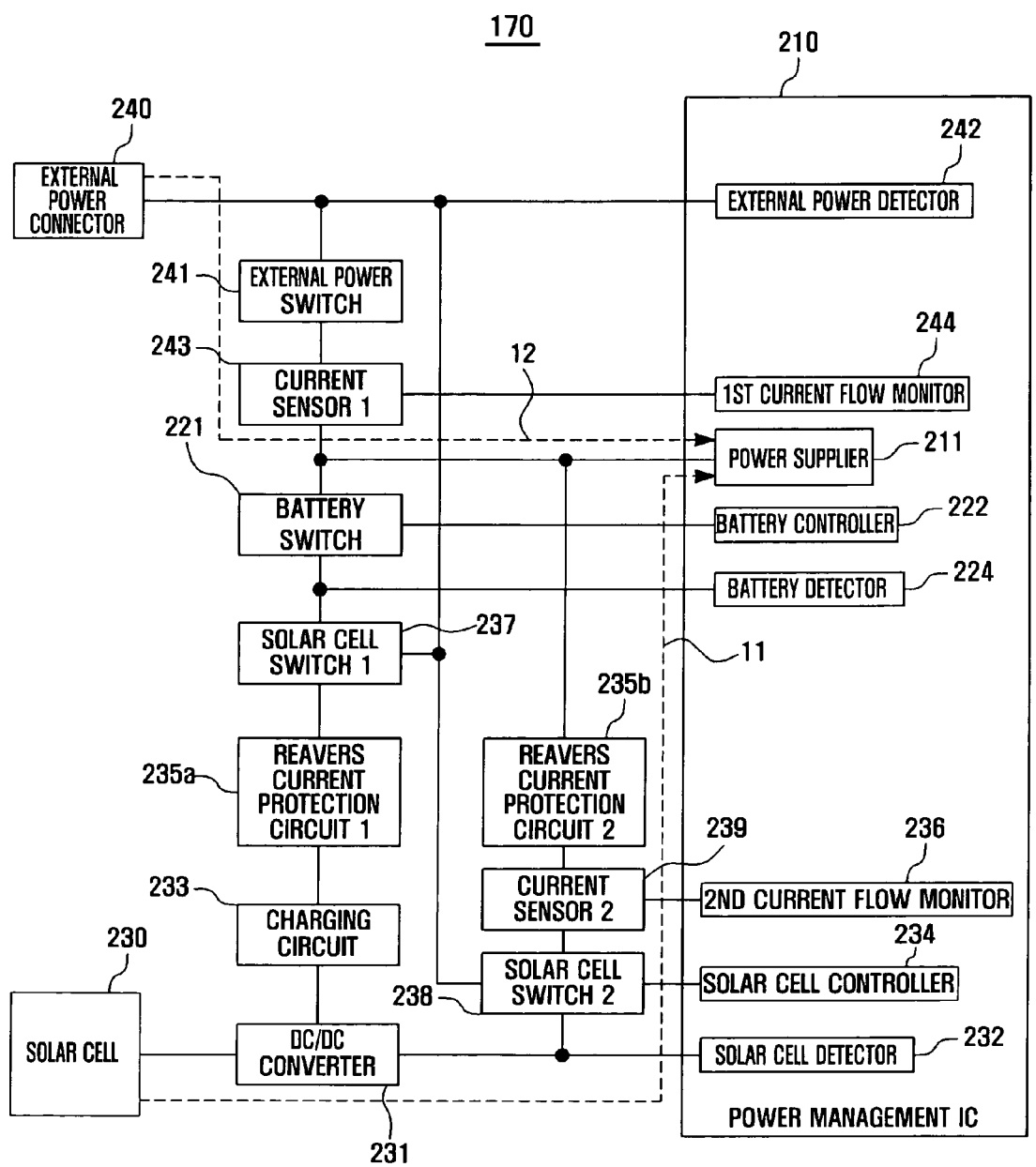
FIG. 3 illustrates a current path in a power supply unit with a battery unavailable or without a battery in accordance with an exemplary embodiment of the present invention.

FIG. 3 illustrates a current path in the power supply unit 170 with the battery unavailable or without a battery in accordance with an exemplary embodiment of the present invention.

Referring to FIG. 3, in a first example the battery is unavailable or absent, the external power source is not connected with the external power connector 240, and the mobile device is powered on. In this state, the external power detector 242, the first current flow monitor 244, the first current sensor 243 and the battery switch 221 do not operate.

While the solar cell 230 is under the sunshine, the solar cell 230 generates electricity and offers it to the DC/DC converter 231. Then the DC/DC converter 231 converts an electric current into a direct current and offers it to the second solar cell switch 238. Meanwhile, the solar cell detector 232 monitors the DC/DC converter 231 to detect the power supply from the solar cell 230 and then informs the solar cell controller 234 about the detection.

The solar cell controller 234 recognizes the power supply from the solar cell 230 and then opens the second solar cell switch 238 in order to form an electric path. At this time, the second current sensor 239 may sense electric power supplied and then may inform the second current flow monitor 236 whether the supplied electric power is in an excess state. The electric power supplied from the solar sensor 230 is offered to the power supplier 211 through the second reverse current protection circuit 235b. The power control unit 210 may recognize disconnections with the battery and the external power source through the battery detector 224 and the external power detector 242. That is, the power control unit 210 may determine that the electric power is supplied from the solar cell 230 only. Then the power control unit 210 may offer the supplied electric power to the main control unit 160 while informing that the solar cell 230 is the only power source.

In a case where the electric power is supplied from the solar cell 230 only, the main control unit 160 determines which functions of the mobile device are available depending upon the capacity of power supply. Then the main control unit 160 selectively activates functions of the mobile device. For a selective activation, the main control unit 160 may store in advance information about the average power consumption of each individual function and its priority. Therefore, based on the average power consumption and the priority, the main control unit 160 may selectively execute functions of the mobile device when receiving the electric power from the solar cell 230 only. At this time, the power control unit 170 may establish the first power supply path 11 from the solar cell 230 to the power control unit 210 via the DC/DC converter 231, the second solar cell switch 238, the second current sensor 239, and the second reverse current protection circuit 235b, by turns.

Alternatively, it is supposed in the second place that the battery is unavailable or absent, the external power source is connected with the external power connector 240, and the mobile device is powered on.

In this state, the power control unit 210 may be further supplied with electric power from the external power source through the external power connector 240. At this time, the external power detector 242 may inform the solar cell controller 234 that the external power source is connected with the external power connector 240. Then the solar cell controller 234 may turn off the first solar cell switch 237 and the second solar cell switch 238 so that the external power source is independently employed. At this time, the power control unit 170 may establish the second power supply path 12 from the external power source to the power control unit 210 via the external power connector 240, the external power switch 241, and the first current sensor 243, by turns.

If necessary, the solar cell controller 234 may enable the solar cell 230 to supply electric power to the power supplier 211. However, since electric power supplied from the external power source is very greater than electric power supplied from the solar cell 230, it may be desirable to cut off the power supply from the solar cell 230 in view of circuit protection. If a difference in electric power between the external power source and the solar cell 230 is not significant, the solar cell controller 234 may keep the power supply from the solar cell 230.

Figure 4:
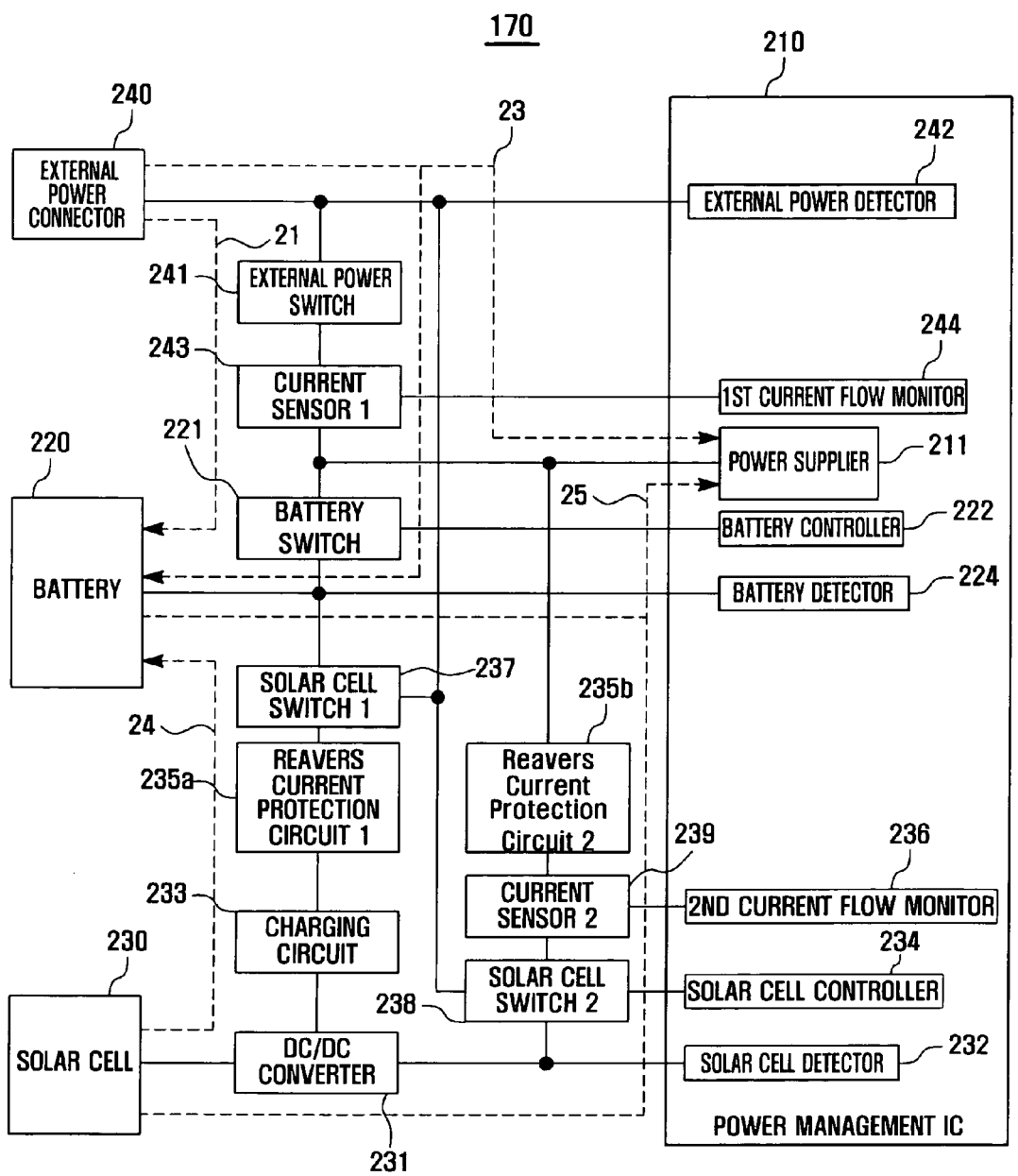
FIG. 4 illustrates a current path in a power supply unit with a battery available in accordance with another exemplary embodiment of the present invention.

FIG. 4 illustrates a current path in the power supply unit 170 with the battery available in accordance with another exemplary embodiment of the present invention.

Referring to FIG. 4, in another example the battery 220 is available, the external power source is connected with the external power connector 240, and the mobile device is powered off.

In this state, the external power detector 242 may ascertain that the external power source is connected with the external power connector 240, and then may inform the battery controller 222 about the connection. The electric power supplied from the external power source is delivered to the battery switch 221 through the external power switch 241 and the first current sensor 243. At this time, if the battery controller 222 turns on the battery switch 221, the external power source is connected with the battery 220. Therefore, the power control unit 170 may establish the third power supply path 21 from the external power source to the battery 220 via the external power connector 240, the external power switch 241, the first current sensor 243, and the battery switch 221, by turns.

However, since the mobile device is powered off, the power supplier 221 does not receive and waits for the electric power from the external power source. Meanwhile, the battery detector 224 may detect the remaining power of the battery 220 and thereby may determine whether to continue charging the battery 220. If the charging amount of the battery 220 is greater than a given value, the battery detector 224 may cut off the third power supply path 21 for charging the battery 220 by closing the battery switch 221.

Alternatively, in another example the battery 220 is available, the external power source is connected with the external power connector 240, and the mobile device is powered on.

In this state, the external power detector 242 may ascertain that the external power source is connected with the external power connector 240, and then may inform both the battery controller 222 and the power supplier 211 about the connection. Therefore, the power control unit 170 may establish the fourth power supply path 23 composed of two sub-paths, namely, one sub-path from the external power source to the power supplier 211 via the external power connector 240, the external power switch 241, and the first current sensor 243, by turns, and the other sub-path equal to the aforementioned third power supply path 21 from the external power source to the battery 220. In other words, the external power source not only supplies the electric power to the power control unit 210, but also charges the battery 220.

If the charging of the battery 220 is completed, the battery controller 222 may turn off the battery switch 221 and thus may leave only the sub-path from the external power source to the power supplier 211. In the meantime, the first and second solar cell switches 237 and 238 may be turned off together by the solar cell controller 234 in order to prevent a reverse current in association with the external power source.

Meanwhile, it is supposed in the third place that the battery 220 is available, the external power source is not connected with the external power connector 240, and the mobile device is powered off.

In this state, the electric power supplied from the solar cell 230 may be offered to the battery 220 through the DC/DC converter 231, the charging circuit 233, the first reverse current protection circuit 235a, and the first solar cell switch 237, by turns. Therefore, the battery 220 may be charged using the electric power supplied from the solar cell 230. At this time, if the solar cell detector 232 detects the power supply from the solar cell 230, the solar cell controller 234 may turn on the first solar cell switch 237. Therefore, the power control unit 170 may establish the fifth power supply path 24 from the solar cell 230 to the battery 220 via the DC/DC converter 231, the charging circuit 233, the first reverse current protection circuit 235a, and the first solar cell switch 237, by turns.

Alternatively, in another example the battery 220 is available, the external power source is not connected with the external power connector 240, and the mobile device is powered on.

In this state, the electric power supplied from the solar cell 230 may be offered to the power supplier 211 through the DC/DC converter 231, the second solar cell switch 238, the second current sensor 239, and the second reverse current protection circuit 235b, by turns. Meanwhile, if there is an input signal for power-on of the mobile device, the battery controller 222 may turn on the battery switch 221 in order to allow the power supply from the battery 220. Therefore, the power control unit 170 may utilize the electric power supplied from the battery 220 as well as the solar cell 230. That is, the power control unit 170 may establish the sixth power supply path 25 composed of two sub-paths, namely, one sub-path from the solar cell 230 to the power supplier 211 via the DC/DC converter 231, the second solar cell switch 238, the second current sensor 239, and the second reverse current protection circuit 235b, by turns, and the other sub-path from the battery 220 to the power supplier 211 via the battery switch 221.

Now, a method for a power control of the mobile device having the solar cell will be described in detail with reference to FIGS. 5 and 6.

Figure 5:
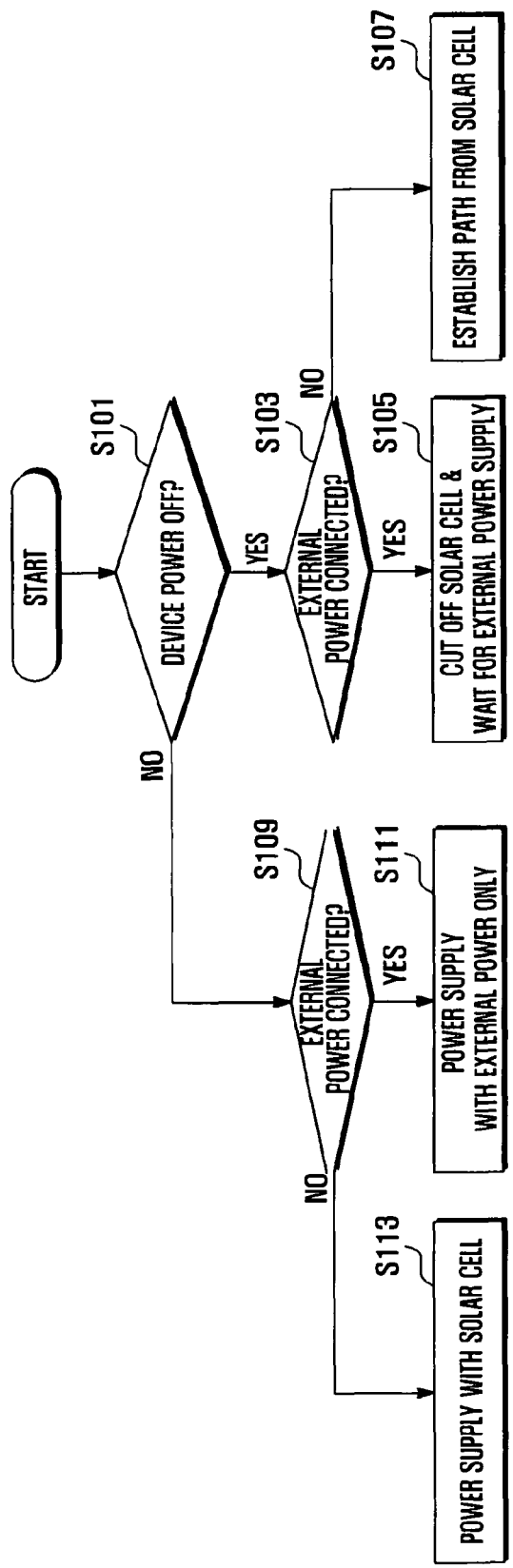
FIG. 5 illustrates a method for controlling a power supply unit with a battery unavailable or without a battery in accordance with an exemplary embodiment of the present invention.

FIG. 5 illustrates a method for controlling a power supply unit with a battery unavailable or without a battery in accordance with an exemplary embodiment of the present invention.

Referring to FIG. 5, in a case where the battery is unavailable or absent, the mobile device determines whether the current state is a power-off state (step S101). If powered off, the mobile device further determines whether the external power source is connected (step S103). In order to ascertain a connection with the external power source in the step S103, the mobile device may employ the external power detector that monitors the external power connector.

If the external power source is connected, the mobile device cuts off a power supply path in association with the solar cell, and then waits for the power supply from the external power source (step S105).

If the external power source is not connected, the mobile device establishes a power supply path in association with the solar cell (step S107). That is, the mobile device may form a power supply path between the solar cell and the power control unit.

Meanwhile, if it is determined in the above step S101 to be powered on, the mobile device further determines whether the external power source is connected (step S109).

If the external power source is connected, the mobile device allows the power supply from the external power source (step S111). That is, the mobile device may form a power supply path between the external power source and the power control unit, while cutting off a path between the external power source and the solar cell.

If the external power source is not connected, the mobile device allows the power supply from the solar cell (step S113). That is, the mobile device may form a power supply path between the solar cell and the power control unit. Then the mobile device may selectively execute functions of the mobile device by electric power supplied from the solar cell.

At this time, the mobile device may ascertain the capacity of the power supply from the solar cell. If the electric power of the solar cell is not sufficient to support all functions of the mobile device, the mobile device may selectively activate functions of the mobile device according to a predefined priority and the average power consumption of each function. If a mobile communication function is defined as a basic function with the highest priority, the mobile device executes first a mobile communication function by consuming electric power supplied from the solar cell. If there is any electric power to spare, the mobile device may selectively perform other functions in consideration of their priorities and the average power consumption.

If a user tries to execute a particular function which has a lower priority or exceeds the power supply limit of the solar cell, the mobile device may give the alarm of shortage in battery and then may compulsorily keep that function disabled. In a case where the mobile device is driven relying on the solar cell only, the mobile device may inform a user whether some selected function other than a basic function is executable or not. Alternatively or additionally, the mobile device may display a list of executable functions based on the power supply of the solar cell.

Figure 6:
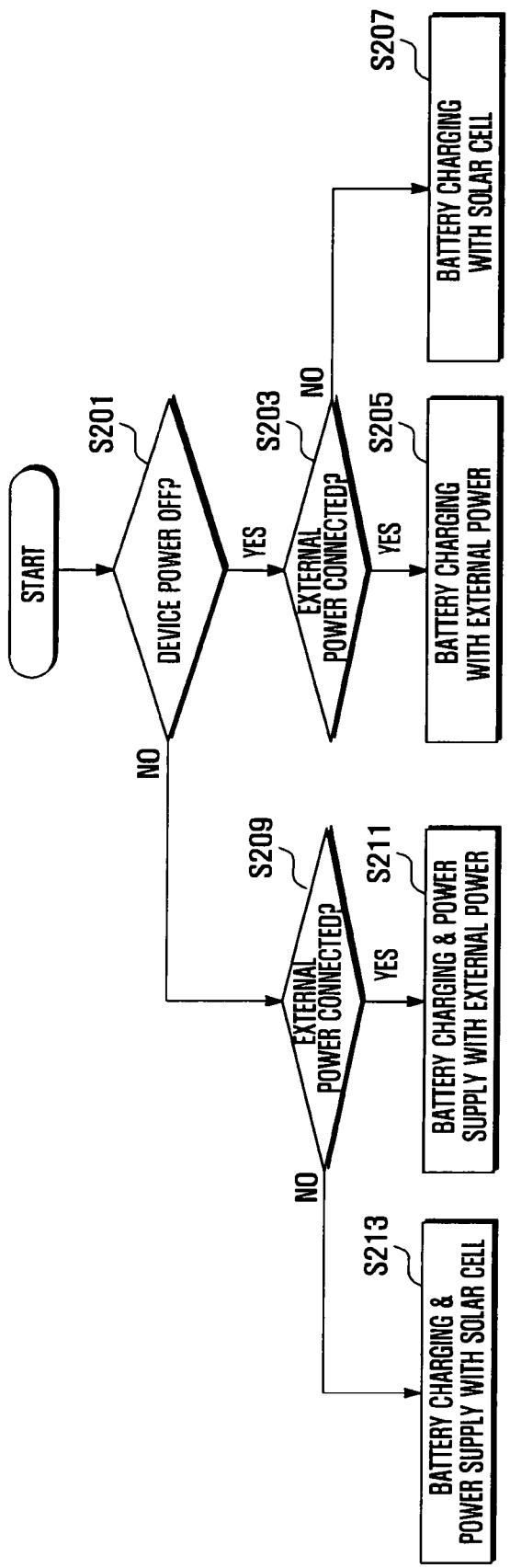
FIG. 6 illustrates a method for controlling a power supply unit with a battery available in accordance with another exemplary embodiment of the present invention.

FIG. 6 illustrates a method for controlling a power supply unit with a battery available in accordance with another exemplary embodiment of the present invention.

Referring to FIG. 6, in a case where the battery is available, the mobile device determines whether the current state is a power-off state (step S201). If powered off, the mobile device further determines whether the external power source is connected (step S203). In order to ascertain a connection with the external power source, the mobile device may use the external power detector that monitors the external power connector.

If the external power source is connected, the mobile device performs a battery charging by using the external power source (step S205). That is, the mobile device may form a power supply path between the external power source and the battery. Additionally, the mobile device may cut off a path between the external power source and the solar cell in order to prevent a reverse current from the external power source to the solar cell.

If the external power source is not connected, the mobile device performs a battery charging by using the solar cell (step S207). That is, the mobile device may form a power supply path between the solar cell and the battery.

Meanwhile, if it is determined in the above step S201 to be powered on, the mobile device further determines whether the external power source is connected (step S209).

If the external power source is connected, the mobile device allows the power supply from the external power source (step S211). That is, the mobile device may form a power supply path between the external power source and the power control unit, while performing a battery charging through a path between the external power source and the battery. Additionally, the mobile device may cut off a path between the external power source and the battery after a battery charging. Also, the mobile device may cut off a path between the external power source and the solar cell.

If the external power source is not connected, the mobile device allows the power supply from both the solar cell and the battery (step S213). That is, the mobile device may form power supply paths between the solar cell and the power control unit and between the battery and the power control unit. If the electric power of the solar cell is sufficient to operate the mobile device, the mobile device may utilize the electric power of the solar cell for a battery charging. For instance, the mobile device which is in an idle state while executing only a reception waiting function among mobile communication functions may need the minimum electric power. In this state, there may be any electric power left in the solar cell, and the mobile device may enable the solar cell to charge the battery.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a power control of a mobile device having a solar cell, the method comprising:
   ascertaining whether a battery is available for the mobile device;

when the battery is unavailable or absent, determining whether a power control unit of the mobile device is connected with an external power source;

when the power control unit is not connected with the an external power source, establishing a power supply path between a solar cell and the power control unit; and supplying electric power of the mobile device from the solar cell through the power supply path.

2. The method of claim 1, further comprising:
receiving electric power supplied from an external power source; and
cutting off the power supply path between the solar cell and the power control unit.

3. The method of claim 1, further comprising:
executing at least one function of the mobile device by using electric power supplied from the solar cell through the power supply path, wherein the at least one function is selectable based on an available power from the solar cell; and
when the power control unit is connected with the external power source, cutting power supply path between the solar cell and the power control unit and executing at least on function by using electric power supplied from the an external power source.

4. The method of claim 3, wherein the executing of at least one function includes:
selecting a particular function among functions of the mobile device, based on both the average power consumption and the priority of each function; and
activating the selected particular function.

5. The method of claim 4, wherein the executing of at least one function includes:
activating a predefined specific function;
receiving a user's selection of a particular function other than the predefined specific function; and
if the electric power supplied from the solar cell is greater than a power consumption required for the execution of the predefined specific function, activating the user's selected particular function.

6. A method for a power control of a mobile device having a solar cell, the method comprising:
ascertaining whether a battery is available for the mobile device;
when the battery is available with the mobile device powered off, determining whether a power control unit of the mobile device is connected with an external power source;
when the power control unit is not connected with the external power source, establishing a power supply path between the battery and the solar cell; and
charging the battery by using electric power supplied from the solar cell through the power supply path.

7. The method of claim 6, further comprising:
receiving electric power supplied from an external power source; and
cutting off the power supply path between the battery and the solar cell.

8. A method for a power control of a mobile device having a solar cell, the method comprising:
ascertaining whether a battery is available for the mobile device;
when the battery is available with the mobile device powered on, determining whether a power control unit of the mobile device is connected with an external power source;

when the power control unit is not connected with the external power source, establishing a first power supply path between the solar cell and a power control unit; and supplying electric power of the mobile device from the battery and the solar cell through the power supply path.

9. The method of claim 8, further comprising:
executing at least one function of the mobile device by using electric power supplied from both the solar cell and the battery;
receiving electric power supplied from an external power source; and
cutting off the first power supply path between the solar cell and the power control unit.

10. The method of claim 8, further comprising:
establishing a second power supply path between the battery and the solar cell; and
charging the battery by using electric power supplied from the solar cell through the second power supply path.

11. A mobile device comprising:
a solar cell configured to produce electric power under the sunshine;
a rechargeable battery configured to supply electric power to the mobile device; and
a control unit configured to receive the electric power supplied from at least one of the battery and the solar cell, an external power source and to supply electric power of the mobile device from the solar cell through the power supply path according to whether a battery is available and whether the power control unit is connected with an external power source, wherein the at least one function is selectable based on an available power from the solar cell.

12. The mobile device of claim 11, wherein the control unit is further configured to execute the at least one function by using the electric power supplied from the solar cell if the battery is unavailable or absent.

13. The mobile device of claim 12, wherein the control unit is further configured to select a particular function among functions of the mobile device, based on both the average power consumption and the priority of each function, and to activate the selected particular function.

14. The mobile device of claim 12, wherein the control unit is further configured to activate a predefined specific function, to receive a user's selection of a particular function other than the predefined specific function, and if the electric power supplied from the solar cell is greater than a power consumption required for the execution of the predefined specific function, to activate the user's selected particular function.

15. The mobile device of claim 11, further comprising:
an external power connector configured to be connected with an external power source,
wherein if the external power connector is connected with the external power source, the control unit is further configured to cut off a power supply path from and to the solar cell.

16. The mobile device of claim 11, wherein the control unit is further configured to charge the battery by using the electric power supplied from the solar cell if the battery is available with the mobile device powered off.

17. A power supply unit for use in a mobile device, the power supply unit comprising:
a solar cell configured to produce electric power under the sunshine;
a rechargeable battery configured to supply electric power to a power control unit; and
the power control unit configured to receive the electric power supplied from at least one of the rechargeable battery, an external power source and the solar cell, and to deliver electric power to the mobile device wherein the power control unit is further configured to deliver power to a main control unit configured to determine whether the power control unit is not connected with an external power source, when the battery is unavailable or absent, and to execute at least one function of the mobile terminal by using the electric power supplied from the solar cell when the power control unit is not connected with the external power source, wherein the at least one function is selectable based on an available power from the solar cell.

18. The power supply unit of claim 17, wherein the power control unit is further configured to select a particular function among functions of the mobile device, based on both the average power consumption and the priority of each function, and to activate the selected particular function.

19. The power supply unit of claim 17, wherein the power control unit is further configured to activate a predefined specific function, to receive a user's selection of a particular function other than the predefined specific function, and if the electric power supplied from the solar cell is greater than a power consumption required for the execution of the predefined specific function, to activate the user's selected particular function.

20. The power supply unit of claim 17, further comprising:
an external power connector adapted to be connected with an external power source,
wherein if the external power connector is connected with the external power source, the power control unit is further configured to cut off a power supply path from and to the solar cell.

21. The power supply unit of claim 17, wherein the power control unit is further configured to charge the battery by using the electric power supplied from the solar cell if the battery is available with the mobile device powered off.

* * * * *